(12) United States Patent
Feng et al.

(10) Patent No.: US 7,374,312 B2
(45) Date of Patent: May 20, 2008

(54) BOTTOM LIGHTING BACKLIGHT MODULE HAVING UNIFORM ILLUMINATION AND PROCESS FOR MANUFACTURING THE SAME

(75) Inventors: Chih-Hua Feng, Fongshan (TW); Mao-Hong Lu, Taipei (TW)

(73) Assignee: National Chiao Tung University, Hsinchu (TW)

( * ) Notice: Subject to any disclaimer, the term of this patent is extended or adjusted under 35 U.S.C. 154(b) by 162 days.

(21) Appl. No.: 11/143,349

(22) Filed: Jun. 2, 2005

(65) Prior Publication Data

US 2006/0133062 A1    Jun. 22, 2006

(30) Foreign Application Priority Data

Dec. 16, 2004    (TW) .............................. 93139078 A

(51) Int. Cl.
*F21V 5/00* (2006.01)
(52) U.S. Cl. .................... 362/246; 362/29; 362/327
(58) Field of Classification Search .................. 362/29, 362/30, 223, 244, 245, 246, 307, 308, 311, 362/327, 330, 600, 606, 607, 614
See application file for complete search history.

(56) References Cited

U.S. PATENT DOCUMENTS

| 3,351,753 A | * | 11/1967 | Berger ......................... 362/330 |
| 5,253,151 A | | 10/1993 | Mepham et al. |
| 5,720,545 A | | 2/1998 | Shaw |
| 5,986,728 A | | 11/1999 | Bernard |
| 6,193,383 B1 | * | 2/2001 | Onikiri et al. .............. 362/327 |
| 6,421,103 B2 | | 7/2002 | Yamaguchi |
| 6,639,350 B1 | * | 10/2003 | Sejkora ...................... 362/223 |
| 2001/0002878 A1 | * | 6/2001 | Sejkora et al. ............. 362/327 |

* cited by examiner

*Primary Examiner*—Y. My Quach-Lee
(74) *Attorney, Agent, or Firm*—Bucknam and Archer

(57) ABSTRACT

The present invention provides a bottom lighting backlight module comprising: a light reflecting plate, a plurality of light sources such as lamp and LED; and a diffusion sheet; wherein said diffusion sheet has an excavated structure of shape with cross-section of an inverted triangle having a specific apex angle ranging from 110 degrees to 130 degrees. Some of the light incident on the excavated structure inside the diffusion sheet can be totally reflected and redirected sideways, so that it is possible to reduce the local brightness for area around each light source but significantly improve the evenness of brightness for the whole module.

5 Claims, 10 Drawing Sheets
(9 of 10 Drawing Sheet(s) Filed in Color)

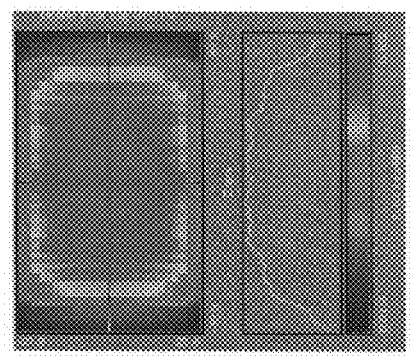 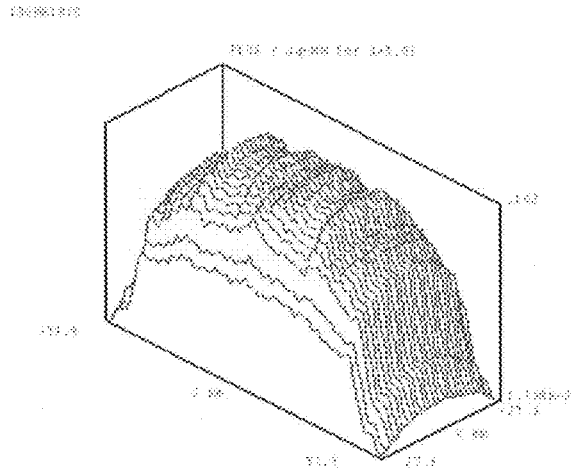
Figure 8c               Figure 8d
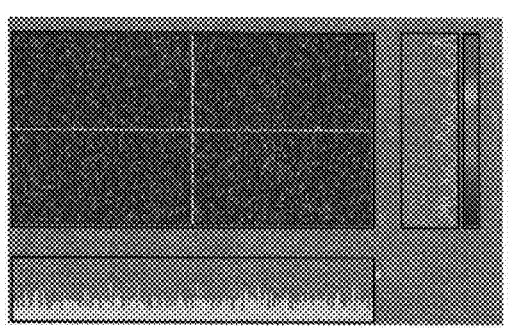 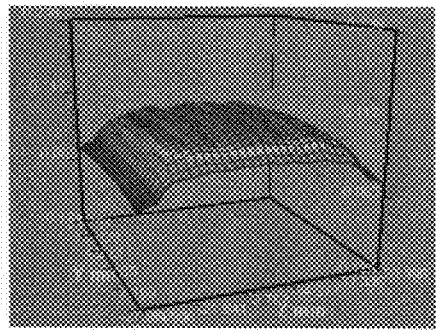
Figure 8e               Figure 8f

BOTTOM LIGHTING BACKLIGHT MODULE HAVING UNIFORM ILLUMINATION AND PROCESS FOR MANUFACTURING THE SAME

FIELD OF THE INVENTION

The present invention relates to a light source module device, especially to a light source module used in liquid crystal display (LCD). The light source module of present invention provides, on top of each light source, an excavated structure capable of guiding and redirecting the light sideways so as to reduce the local brightness around the light source and improve the evenness of brightness for whole module. With such structure, the present invention has achieved not only a light source module of highly uniform in brightness but also a light source module of extremely thin in thickness.

BACKGROUND ART

The LCD light source module is one of the critical components in LCD technology responsible for providing uniform and sufficient light on LCD panel. Since the light source module consumes more than 50% of the power in a LCD, it is a relative important subject of LCD technology to provide uniform light of desired brightness under limited power available.

There are two types, i.e., back lighting and front lighting, of light source module; the back lighting type can be classified into edge lighting form and bottom lighting form in accordance with different incident position while the front type can only be an edge lighting form. Currently, two to eight edge lighting lamps are used together with a light guiding plate and an optical film to provide light source of high evenness and efficiency for LCD products of less than 20 inches in size. Bottom lighting backlight module has become the main stream in the light source of large LCD monitors/televisions due to more rigorous characteristics on brightness and view angle are required on such products. However, the bottom lighting backlight module needs more lamps and greatly increases the cost in comparison to an edge lighting module. On the other hand, adding the number of lamps may result in problems on heat dissipation and power consumption, thereby making improvement on the structure design has become a key factor for the manufacturer to success in the development of new product.

FIG. 1 is a schematic view showing a bottom lighting light source module of prior art. As shown in the figure, a twelve-lamp backlight module used in a twenty-three inches panel has a total thickness of 25 to 30 mm and a 4.8 mm space between adjacent lamps. In general, such light source module can provide brightness evenness from 65 to 75%, while a high standard module of such kind can provide a brightness evenness of up to 85%.

A typical bottom lighting backlight module as shown in FIG. 1 comprises a light reflecting plate 1 one side of the lamp array and a light diffusion sheet 2 on the opposite side of the light reflecting plate, wherein prisms are adhered to the upper or lower surface of the diffusion sheet. In some case, modifications of patented shapes such as triangular or circular pillars are made on the light reflecting plate to redirect the light from a bright area or position right beneath the lamp to a dark area or a position located between bright areas. Most of the manufacturers simply use a flat light reflecting plate (see U.S. Pat. Nos. 5,253,151 and 5,720,545); reduce the brightness of the diffusion sheet on area right above each lamp by applying certain material to these areas and increase light emitted from dark area by mixing highly reflective material such as titanium dioxide in said diffusion sheet; or average the brightness evenness on the diffusion sheet by forming microstructures on the diffusion sheet (see U.S. Pat. Nos. 5,986,728 and 6,421,103). Furthermore, it is difficult to reduce the thickness of entire backlight module 4 to less than 1 cm while maintaining high evenness in its brightness. It is also difficult to achieve a brightness with evenness higher than 80% by means of a diffusion plate thicker than 2 cm.

SUMMARY OF THE INVENTION

An object of present invention is to improve the brightness evenness in existing backlight module. Another object of present invention is to provide a process of manufacturing a bottom lighting backlight module with greatly reduced thickness. The above objects of present invention is achieved by a bottom lighting backlight module providing on top of each light source with a novel excavated structure capable of guiding and redirecting the light sideways so as to reduce the local brightness around the light source and improve the brightness evenness of the whole module.

DETAILED DESCRIPTION OF THE INVENTION

As shown in FIGS. 2 and 4, the bottom lighting backlight module 4 of present invention has a structure similar to edge lighting backlight modules in back-to-back arrangement except the excavated structure 5 inside its diffusion sheet 2' and displaced light source 3. Light incidents to the interface between the diffusion sheet and the excavated space 5' at an angle smaller than the critical angle of said diffusion sheet (e.g., position A in FIG. 3) will be partially reflected and partially refracted, while light incidents at an angle equal or larger than the critical angle (e.g., position B in FIG. 3) will be totally reflected and redirected to both sides so as to reduce the difference of brightness between bright areas and dark areas.

With such excavated structure formed inside the diffusion sheet instead of microstructures formed on the surface of the diffusion sheet, the present invention is capable of achieving an brightness with evenness higher than 95% by means of a bottom lighting backlight module less than 1 cm in thickness, in comparison to a brightness evenness of less than 80% and a thickness of more than 2 to 3 cm.

The advantageous effects of present invention will be explained through simulation results obtained from ASAP random number generator with settings given as follows:

a. Wedge Plate

The surface of the wedge plate is considered to be smooth with no surface roughness. The ASAP-simulated light travels in the wedge plate in accordance with the Fresnel's Law. Properties of both PC (polycarbonate) and PMMA (poly (methyl methylacrylate)) made wedge plate are listed in Table 1. As can be seen from table 1, PC has higher temperature endurance than PMMA and is more preferable in the thinner backlight module of present invention with more heat dissipation problem.

b. Light Source

The ASAP random number generator is used to simulate the light source as a Lambertian light emitter. The simulation can be achieved either by randomly generating a set of isotropic light and modify the flux of each light in accordance with Lambertian's cosine law or by generating lights with identical flux with the number of light decreasing as departing from normal of the surface. The former approach is time consuming and the latter is more efficient in light tracing for large number of lights. With enough number of lights, both approaches have similar results. The present invention has simulated three lamps each with two million lights to obtain satisfactory results, while more components or much complicated structure may need more lights.

c. Light Reflecting Plate

The light reflecting plate is considered to be ideal and produces no absorption, scattering or diffusion.

d. Detection Faces

Ideal absorptive faces function as detection faces are assigned to both the upper surface and the end face of the wedge plate. The flux of each ray absorbed is calculated and summed up to obtain the brightness on such detection faces.

e. Definition of Brightness Evenness

From FIG. 5, the brightness evenness η is defined as the ratio of the minimum flux (Min) to maximum flux (Max) and is a relative instead of absolute value:

$$\eta = Min/Max.$$

in which the unit for the distribution of brightness is Flux/mm$^2$. The present invention can be exemplified but not limited to the following simulated embodiments:

FIRST EMBODIMENT

Parallel Plate

FIG. 6 shows the simulation result obtained from a parallel plate made of PC. The brightness evenness obtained on the detection face 1 located on YZ plane is only 30% with the maximum flux of about 0.206 Flux/mm$^2$, while almost no light is detected on the detection face 2 located on YZ plane which means no light is redirected to dark area.

SECOND EMBODIMENT

Diffusion Sheet Made of PC with Triangular Excavated Structure

FIG. 7 shows the simulation result similar to FIG. 6 using a diffusion sheet made of PC with triangular excavated structure. The brightness evenness obtained on the detection face 1 is about 43% with the maximum flux of about 0.114 Flux/mm$^2$, while the maximum flux of about 1.7 Flux/mm$^2$ is obtained on the detection face 2 which means more lights are redirected to dark area.

THIRD EMBODIMENT

Diffusion Sheet Made of PC with Triangular Excavated Structure

Change the apex angle 10 in FIG. 8a to 120 degree. The brightness evenness obtained on the detection face 1 is about 95% with the maximum flux of about 0.102 Flux/mm$^2$, while the maximum flux of about 1.38 Flux/mm$^2$ is obtained on the detection face 2 which means less lights are redirected to dark area in comparison to the case of FIG. 7.

FOURTH EMBODIMENT

Diffusion Sheet Made of PMMA with Triangular Excavated Structure

FIG. 9 shows the result similar to FIG. 8 by using PMMA as the material of diffusion sheet instead of PC. As can be seen from FIG. 9, since PMMA has a critical angle larger than PC, less lights are totally reflected and redirected to dark areas, thereby the brightness evenness of the backlight module is degraded to 82% on said detection face 1. FIG. 10 shows the effect of varying the apex angle 10 in the diffusion sheet of FIG. 9. The best brightness evenness obtained from the diffusion sheet of FIG. 10 is 93% with the cost of reducing the thickness of dark area to 0.8 mm and has caused problem of fragility.

FIFTH EMBODIMENT

Diffusion Sheet with Triangular Excavated Structure

Change the apex angle 10 in FIG. 8a to 110 degree by changing the length of segment AB with all other parameters unchanged and the results are given in Table 2.

SIXTH EMBODIMENT

Process of Assembling a Diffusion Sheet with Triangular Excavated Structure

FIG. 11 is a disassembled diagram showing the process of manufacturing a wedge-shaped diffusion sheet 2'. The present invention has proposed a simple process of manufacturing the diffusion sheet with the novel excavated structure. First, cutting grooves with triangular cross-section from a parallel plate to form plate 8. Then, a second parallel plate 9 is placed on the side of plate 8 having grooves formed thereon to complete the diffusion sheet of present bottom lighting backlight module.

TABLE 1

Comparison between diffusion sheet made of PC & PMMA

|  | PMMA | PC |
|---|---|---|
| Nd | 1.49 | 1.586 |
| Nc | 1.488 | 1.581 |
| Nf | 1.496 | 1.598 |
| Temperature endurance | 92° C. | 124° C. |
| Transmission (%) (plate of 3.175 mm thick) | 92% | 89% |

TABLE 2

The illumination evenness of different apex angle and segment AB in excavated structure

| Apex angle Θ = 110° of excavated structure | | Θ = 120° | | Θ = 130° | |
|---|---|---|---|---|---|
| length of segment AB (mm) | evenness (%) | length of segment AB (mm) | evenness (%) | length of segment AB (mm) | evenness (%) |
| 4.1 | 71 | 3.8 | 88 | 3.8 | 78 |
| 4.2 | 87 | 3.9 | 95 | 3.9 | 86 |
| 4.3 | 90 | 4.0 | 92 | 4.0 | 83 |
| 4.4 | 85 | 4.1 | 89 | 4.1 | 80 |

BRIEF DESCRIPTION OF DRAWINGS

The patent or application file contains at least one drawing executed in color. Copies of this patent or patent application publication with color drawings will be provided by the Office upon request and payment of the necessary fee.

The above and other objects, features, and advantages of present invention will become more apparent from the detailed description in conjunction with the following drawings, where all dimensions on each module used for the simulation are indicated in millimeter:

FIG. 8c is a diagram showing the intensity distribution of light detected from the detection face 1 of said diffusion plate in a backlight module; FIG. 8d is a profile diagram showing the light intensity distribution of FIG. 8c with respect to positions on the detection plane; FIG. 8e is a diagram showing the intensity distribution of light detected from the detection face 2 of said diffusion plate in a backlight module; and FIG. 8f is a profile diagram showing the light intensity distribution of FIG. 8e with respect to positions on the detection plane.

Figure 1:
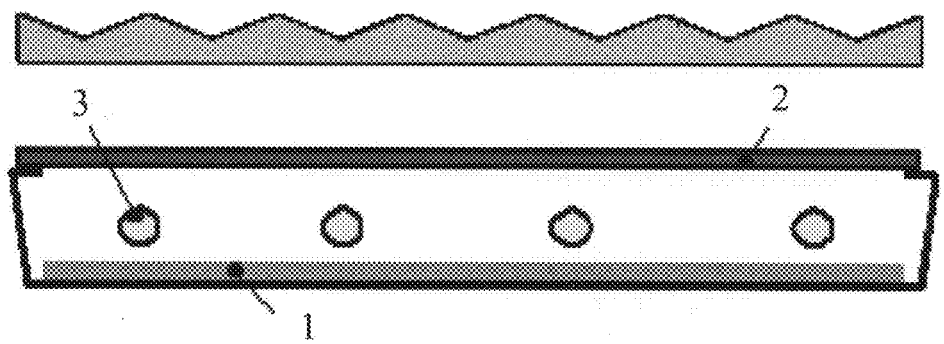
FIG. 1 is a schematic view showing a bottom lighting light source module of prior art.
Figure 2:
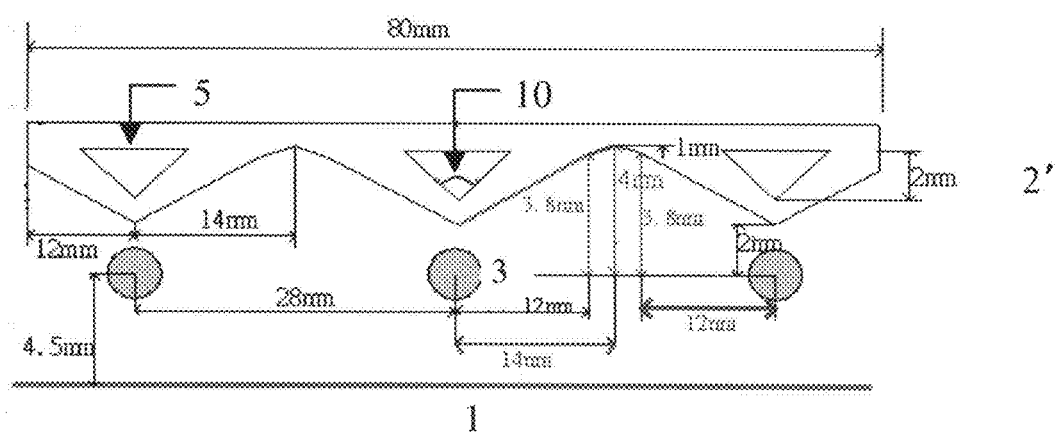
FIG. 2 is a schematic view showing the structure of a bottom lighting backlight module in accordance with present invention.
Figure 3:
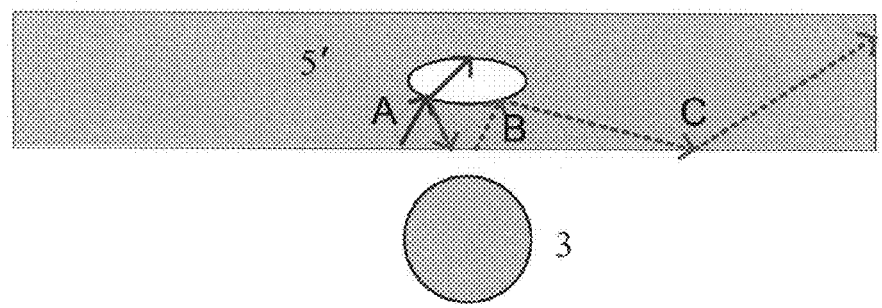
FIG. 3 is a schematic view showing the structure of a diffusion sheet used in the bottom lighting backlight module.
Figure 4:
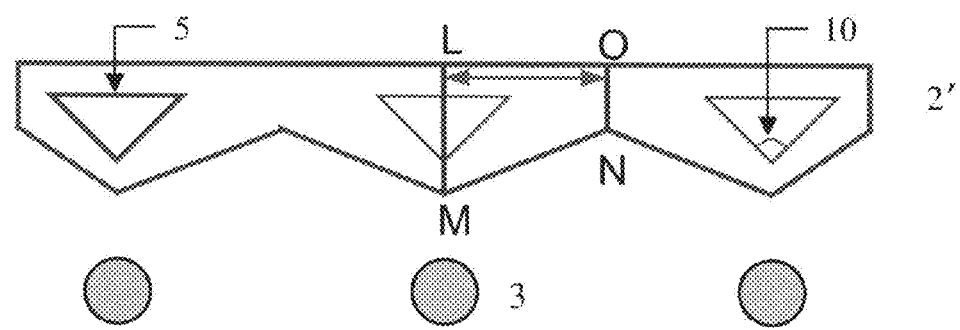
FIG. 4 is a schematic view showing the structure of a bottom lighting backlight module in accordance with present invention.
Figure 5:
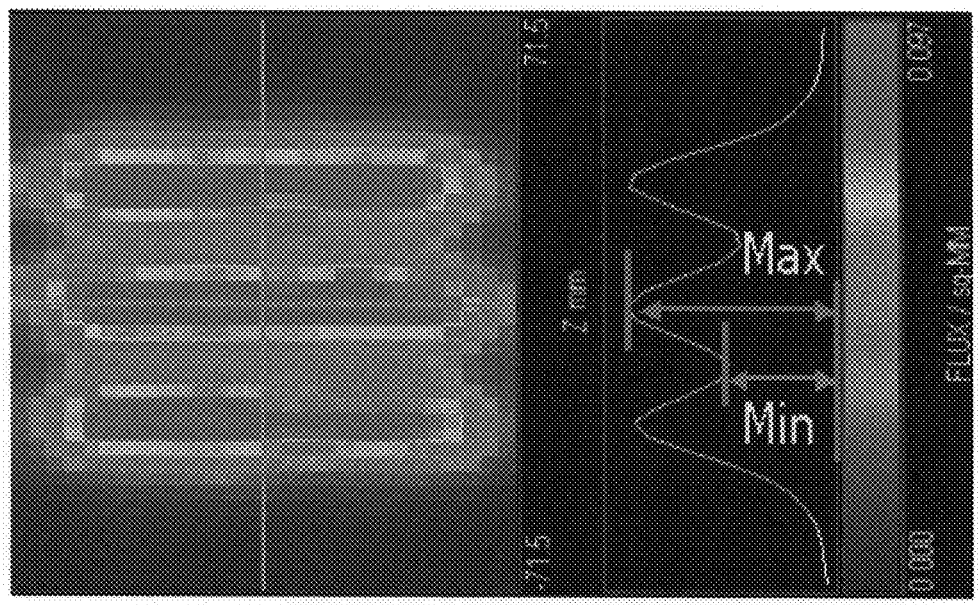
FIG. 5 is a diagram showing the intensity distribution of light emitted from the bottom lighting backlight module of present invention.
Figure 6A:
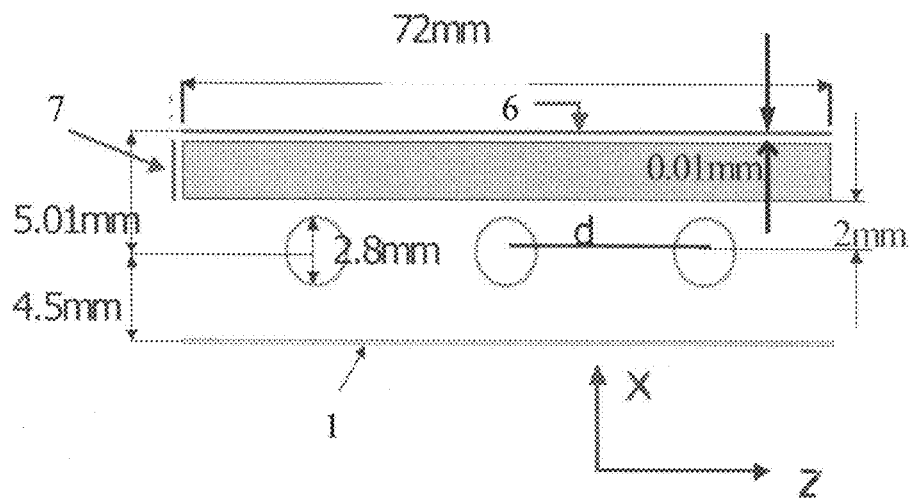
FIG. 6a is a schematic view showing the structure of a flat diffusion plate.
Figure 6B:
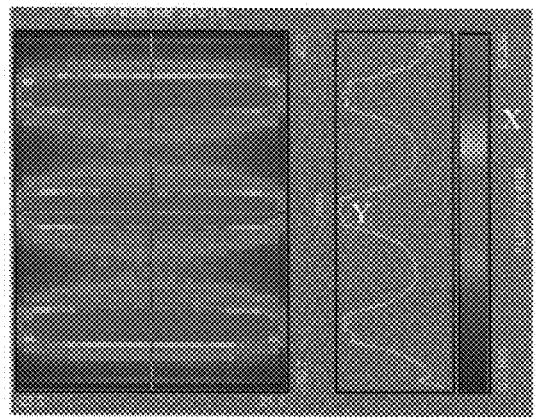
FIG. 6b is a diagram showing the intensity distribution of light detected from the upper side (detection face 1) of the flat diffusion plate in a backlight module.
Figure 6C:
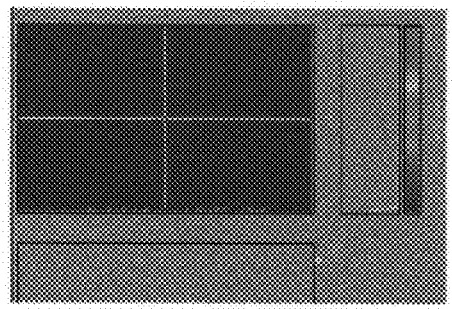
FIG. 6c is a diagram showing the intensity distribution of light detected from the end face (detection face 2) of the flat diffusion plate in a backlight module.
Figure 7A:
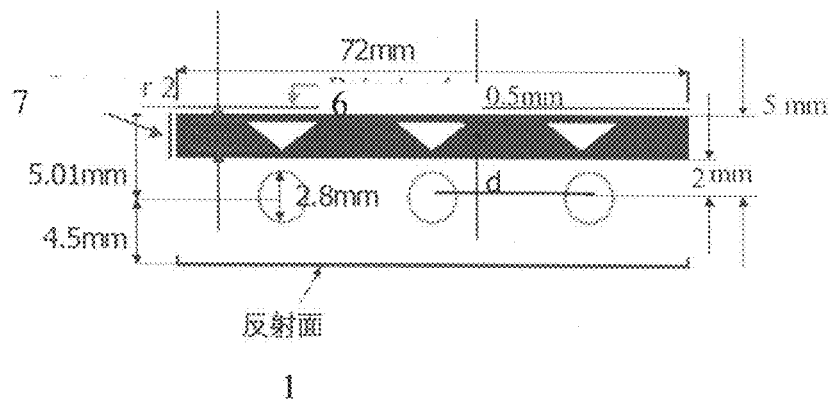
FIG. 7a is a schematic view showing the structure of a flat diffusion plate having parallel arranged excavated tubular structure of triangular cross-section.
Figure 7B:
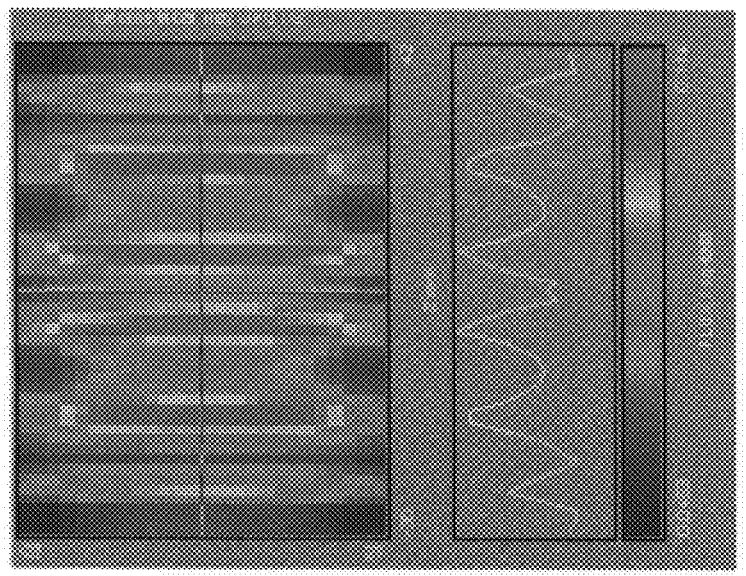
FIG. 7b is a diagram showing the intensity distribution of light detected from the detection face 1 of said diffusion plate in a backlight module.
Figure 7C:
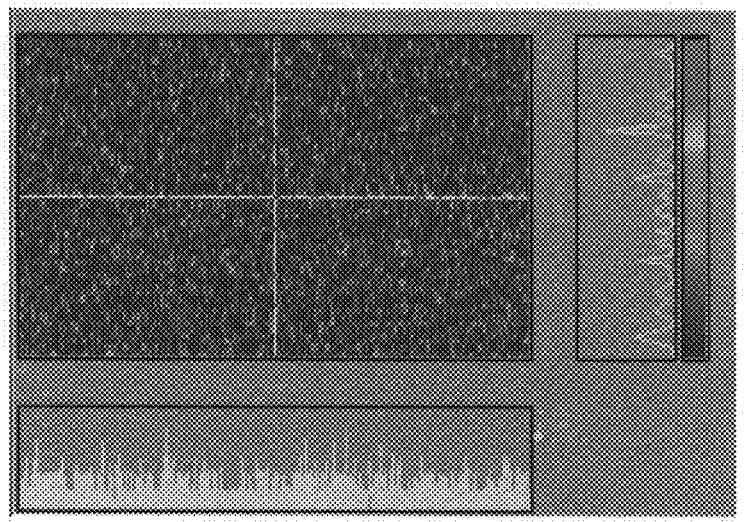
FIG. 7c is a diagram showing the intensity distribution of light detected from the detection face 2 of said diffusion plate in a backlight module.
Figure 8A:
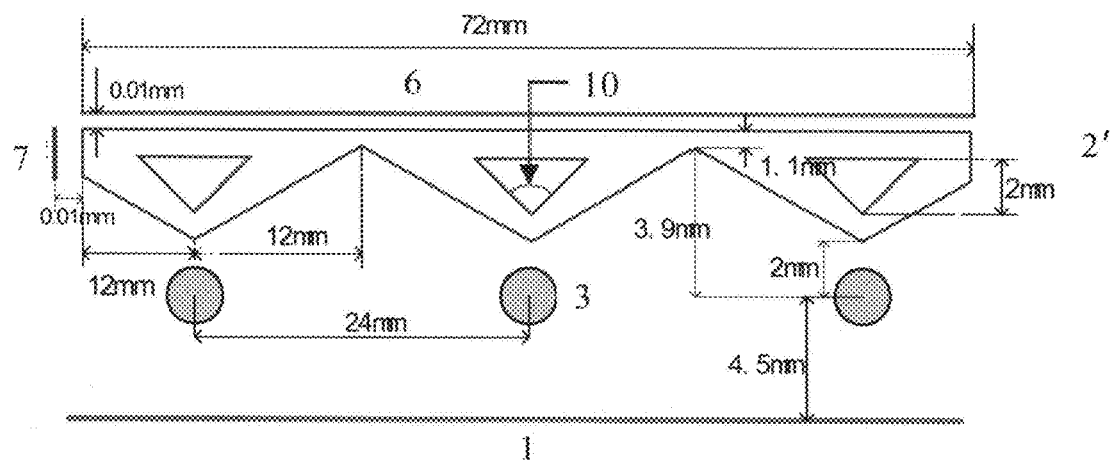
FIG. 8a is a schematic view showing the structure of a wedge-shaped diffusion plate having parallel arranged excavated tubular structure of triangular cross-section.
Figure 8B:
FIG. 8b is a three-dimensional diagram showing the simulated structure of said backlight module.
Figure 9A:
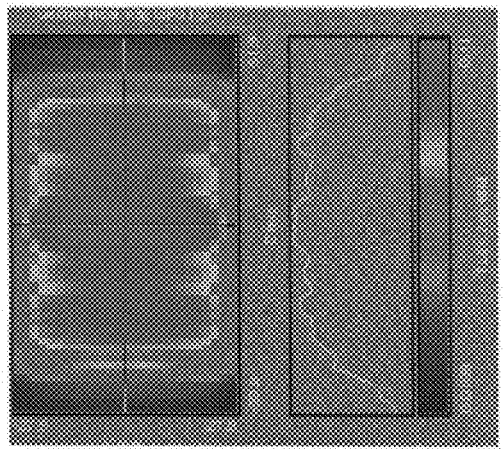
FIG. 9a is a diagram showing the intensity distribution of light detected from the detection face 1 of a diffusion plate similar to FIG. 8a but made of PMMA.
Figure 9B:
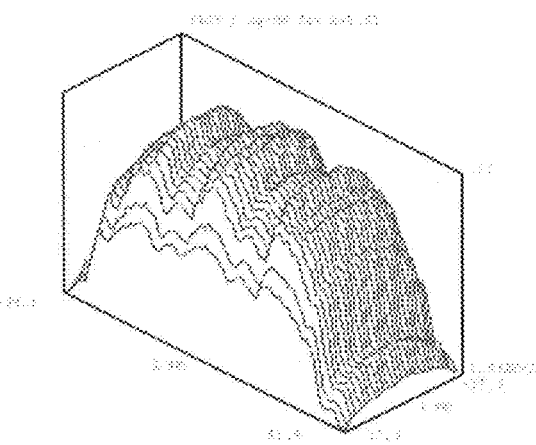
FIG. 9b is a diagram showing the intensity distribution of light detected from the detection face 2 of said diffusion plate in a backlight module.
Figure 9C:
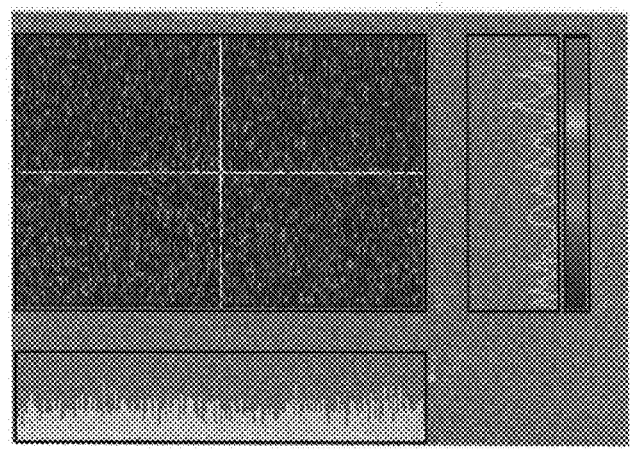
FIG. 9c is a profile diagram showing the light intensity distribution of FIG. 9b with respect to positions on the detection plane.
Figure 10A:
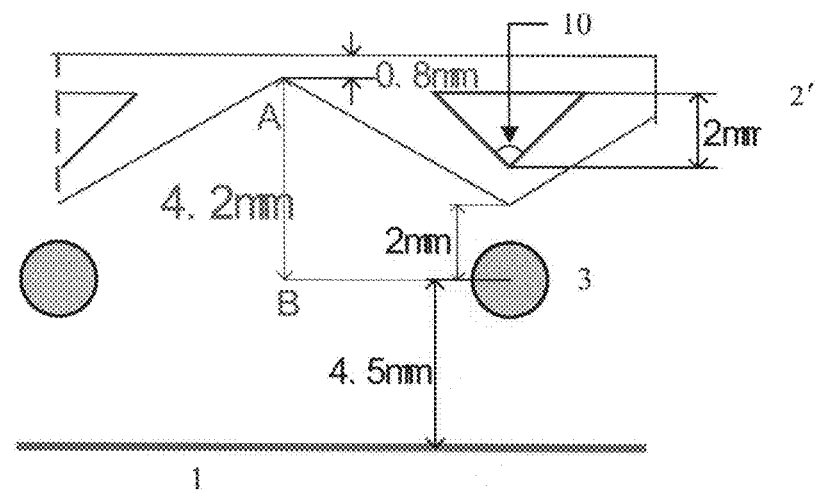
FIG. 10a is a diagram showing the structure of a diffusion plate similar to FIG. 9.
Figure 10B:
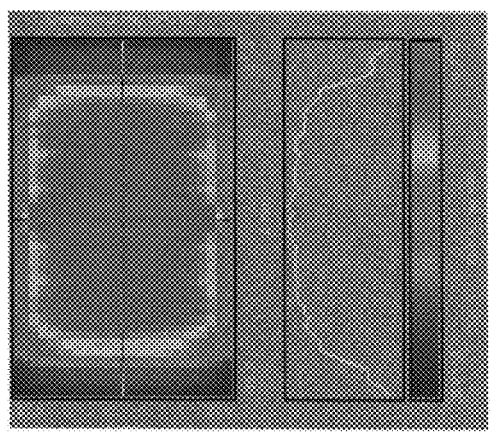
FIG. 10b is a diagram showing the intensity distribution of light detected from the detection face 1 of said diffusion plate between two light sources.
Figure 10C:
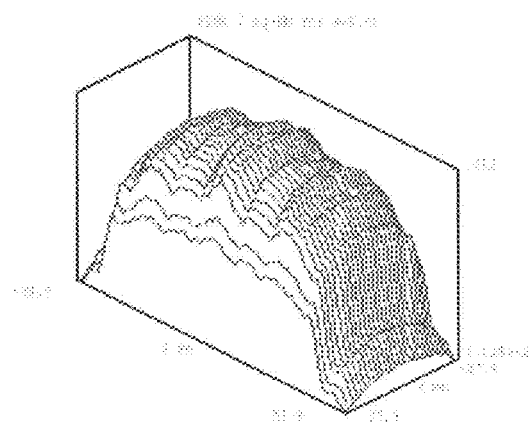
FIG. 10c is a profile diagram showing the light intensity distribution of FIG. 10b with respect to positions on the detection plane.
Figure 11:
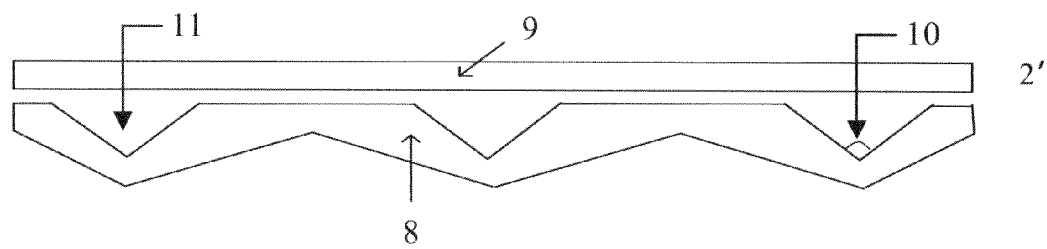
FIG. 11 is a schematic view showing the structure of a wedge-shaped diffusion plate in disassembled state.

DESCRIPTION OF SYMBOL 1 light reflecting plate
2 diffusion sheet
2' wedge shaped diffusion sheet
3 light sources
4 module
5 excavated structure
5' tubular excavated space
6 detection face 1
7 detection face 2
8 plate 8
9 plate 9
10 apex angle of the inverted triangle
11 inclined troughs of wedge plate 8

The invention claimed is:

1. A bottom lighting backlight module comprising a plurality of light sources (3) and a wedge-shaped diffusion sheet (2');
   wherein said diffusion sheet (2') has an excavated structure (5) of shape with cross-section of an inverted triangle having a specific apex angle (10) ranging from 110 degrees to 130 degrees, some of the light emitted from light source (3) that enter the excavated area inside the diffusion sheet (2') can be totally reflected and redirected toward both sides by said excavated structure (5), so that it is possible to reduce the local brightness for area around each light source (3) but significantly improve the evenness of brightness for the whole module (4).

2. The bottom lighting backlight module as set forth in claim 1, wherein said backlight module (4) further comprises a light reflecting plate (1) beneath light sources (3).

3. The bottom lighting backlight module as set forth in claim 1, wherein the brightness evenness of the entire module (4) is at least 85% and preferably more than 90%.

4. A process for manufacturing the bottom lighting backlight module as set forth in claim 1 comprises a step of cutting inclined troughs (11) from a wedge shaped plate to form a plate (8) and a step of covering a parallel plate (9) on top of said plate (8) to complete said diffusion sheet.

5. The bottom lighting backlight module as set forth in claim 1, wherein said specific apex angle is 120 degrees.

* * * * *